(12) United States Patent
Tortora et al.

(10) Patent No.: US 12,468,265 B2
(45) Date of Patent: Nov. 11, 2025

(54) ELECTRIC POWER GENERATION DEVICE FOR TIMEPIECE

(71) Applicant: The Swatch Group Research and Development Ltd, Marin (CH)

(72) Inventors: Pierpasquale Tortora, Neuchâtel (CH); Cédric Nicolas, Neuchâtel (CH); Jean-Jacques Born, Morges (CH); Arnaud Maurel, Buttes (CH)

(73) Assignee: The Swatch Group Research and Development Ltd, Marin (CH)

( * ) Notice: Subject to any disclaimer, the term of this patent is extended or adjusted under 35 U.S.C. 154(b) by 322 days.

(21) Appl. No.: 18/141,758

(22) Filed: May 1, 2023

(65) Prior Publication Data
US 2024/0012360 A1 Jan. 11, 2024

(30) Foreign Application Priority Data
Jul. 6, 2022 (EP) .................................... 22183365

(51) Int. Cl.
*G04C 3/00* (2006.01)
*G04C 10/00* (2006.01)

(52) U.S. Cl.
CPC ............. *G04C 3/008* (2013.01); *G04C 10/00* (2013.01)

(58) Field of Classification Search
CPC ........ G04C 3/008; G04C 10/00; G04G 19/00; G04G 19/10; H02K 7/1861
See application file for complete search history.

(56) References Cited

U.S. PATENT DOCUMENTS

| 4,008,566 A | * | 2/1977 | Mcclintock ............ G04C 10/00 368/64 |
| 4,644,246 A | | 2/1987 | Knapen |
| 5,614,779 A | | 3/1997 | Zafferri |
| 5,923,619 A | | 7/1999 | Knapen et al. |
| 6,023,446 A | * | 2/2000 | Farine .................... G04C 10/00 368/204 |

(Continued)

FOREIGN PATENT DOCUMENTS

| GB | 2 262 988 A | 7/1993 |
| JP | 53-042773 A | 4/1978 |

(Continued)

OTHER PUBLICATIONS

European Search Report for EP 22 18 3365 dated Dec. 1, 2022.

*Primary Examiner* — Edwin A. Leon
(74) *Attorney, Agent, or Firm* — Sughrue Mion, PLLC

(57) ABSTRACT

A time-limited power generation device (100) for a timepiece (1000), including a manoeuvring member (1) manoeuvrable by a user against an elastic return (2) arranged to indirectly drive an electric generator (6) for generating an electric current for a limited time period, and including a toothed member (3) movable with a degree of freedom relative to said manoeuvring member (1) and delimiting therewith a separate chamber (20) for receiving each elastic return (2), held compressed in its chamber (20) between a pre-stressed position of rest and a maximum compression position, between a first support banking (11) that includes the manoeuvring member (1) and a second support banking (32) that includes the toothed member (3), arranged to be driven by the elastic return (2) for driving the electric generator (6) directly or indirectly through a geartrain.

16 Claims, 6 Drawing Sheets

(56) References Cited

U.S. PATENT DOCUMENTS

| | | | | |
|---|---|---|---|---|
| 6,097,675 | A | * | 8/2000 | Takahashi .............. G04C 10/00 |
| | | | | 310/75 A |
| 6,441,516 | B1 | * | 8/2002 | Kaelin ..................... F16F 1/10 |
| | | | | 368/208 |
| 6,587,401 | B2 | * | 7/2003 | Rebeaud ................ G04C 10/00 |
| | | | | 368/204 |
| 6,603,236 | B2 | * | 8/2003 | Nagasaka ................ H02K 1/02 |
| | | | | 310/156.01 |
| 7,031,230 | B1 | * | 4/2006 | Nagasaka .............. G04C 10/00 |
| | | | | 368/204 |

FOREIGN PATENT DOCUMENTS

| | | |
|---|---|---|
| JP | 11-006883 A | 1/1999 |
| JP | 2001-329944 A | 11/2001 |

* cited by examiner

ELECTRIC POWER GENERATION DEVICE FOR TIMEPIECE

CROSS REFERENCE TO RELATED APPLICATIONS

This application is a non-provisional application, claiming priority based on European Patent Application no. 22183365.0 filed Jul. 6, 2022.

TECHNICAL FIELD OF THE INVENTION

The invention relates to a time-limited power generation device for a timepiece, including a manoeuvring member manoeuvrable by a user against at least one elastic return means, which at least one elastic return means is arranged to drive indirectly at least one electric generator for generating an electric current for a limited period.

The invention also relates to a timepiece including at least one electric generator for supplying electricity to at least one circuit, including at least one such time-limited power generation device. The invention relates to the field of generating electrical power for powering electrical functions in a timepiece, in particular a watch.

TECHNOLOGICAL BACKGROUND

Many timepieces, in particular watches, are provided with lighting functions, which can be activated on demand. Such functions can be functional in nature, such as backlighting a display, a dial or the like, or can be more fun such as displaying images logos or even holograms. A lighting system usually includes mainly an electrical power source, one or more light sources (LED, OLED, electroluminescence, or the like), and an electronic control system (passive components, time management device or timer, voltage booster, to name but a few).

The components of such a lighting system are bulky and heavy, which is a disadvantage in the case of a watch. In particular, the source of electrical energy can be either a primary battery, a rechargeable battery, or an accumulator of charges which have been previously generated in a system such as a photovoltaic, thermoelectric or piezoelectric cell. An electronic control system is usually provided for activating the lighting and defining its duration. It is very rare that users have to switch off the lighting themselves.

Most of these devices come from the electronics industry. They are formed by chemical components (electrolytes in the batteries), as well as polymeric components (packaging, light guides, printed circuits). These types of materials are generally banned from mechanical watches in a certain range, as they tend to deteriorate over time. This can cause aesthetic damage (colour change, stains), or, even worse, debris circulating inside the watch.

The problem is the same for other receiver circuits than lighting circuits, in particular for generating sounds or signals, or signals for safe crossings or the like.

SUMMARY OF THE INVENTION

The invention proposes a simplification of the generation of electric current in a timepiece, in particular a watch, by eliminating circuits and systems that may generate functional and/or visual pollution in the timepiece and alter its value and/or operation.

To this end, the invention aims to allow the user to generate the necessary amount of electrical energy themselves, for a limited and predetermined period of time, by acting on a manoeuvring member external to the timepiece, such as a bezel or the like, to activate an electrical function, for example and not just limited to a lighting function.

The manoeuvring member is configured to drive an electric generator, in particular an electromagnetic microgenerator, for a certain period of time, in order to supply electric current to one or more user electric circuits. This function is performed without the use of an electric charge storage system or an electronic timing device, thereby reducing the size, mass, and cost of the device.

Thus, to this end, the invention relates to a time-limited power generation device for a timepiece, including a manoeuvring member manoeuvrable by a user against at least one elastic return means, which at least one elastic return means is arranged to drive indirectly at least one electric generator for generating an electric current for a limited period according to claim 1.

The invention also relates to a timepiece including at least one electric generator for supplying electricity to at least one circuit, including at least one such time-limited power generation device.

BRIEF DESCRIPTION OF THE FIGURES

The aims, advantages and features of the invention will become more apparent upon reading the following detailed description, with reference to the appended drawings, wherein.

DETAILED DESCRIPTION OF THE INVENTION

Figure 1:
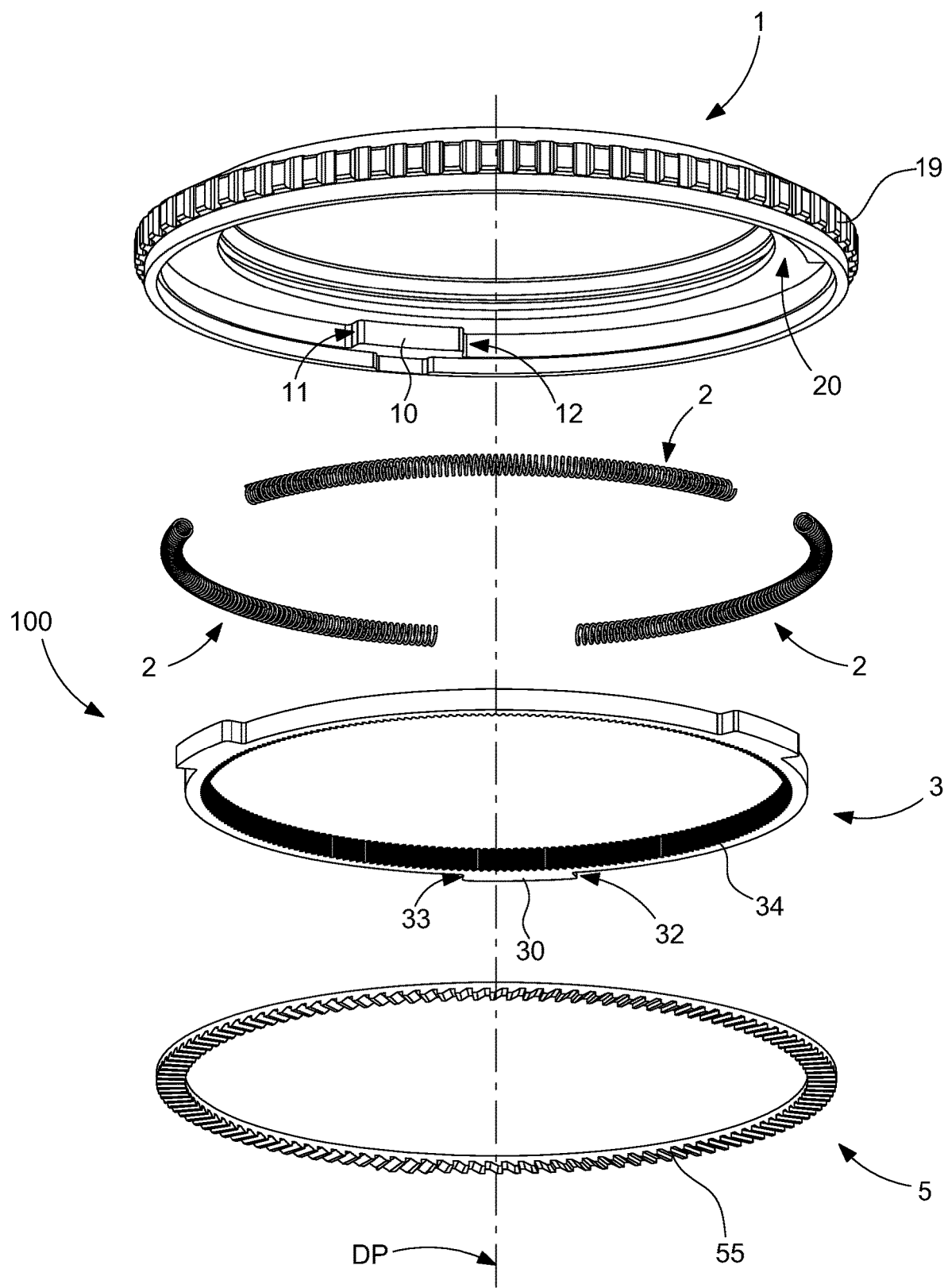
FIG. 1 shows, in exploded perspective, the control members of a device according to the invention, in this particular and non-limiting case of a rotary mechanism, with, arranged coaxially about a main axis, from top to bottom:
  a manoeuvring member, formed by a watch bezel in this particular non-limiting case, including a series of grooves in the form of annular sectors, separated by inner catches projecting towards the axis, each of these grooves forming a chamber for receiving an elastic return means, here a helicoidal spring in this particular non-limiting case;
  an assembly of several such elastic return means, here three in number in this particular example;
  a toothed member, including outer catches projecting externally, arranged to retain the springs in their chambers and compress them there, and including peripheral inner toothing, provided for driving a gear pinion or similar component of a geartrain of an electric generator;
  a notched ring fixed to the upper manoeuvring member, including asymmetrical teeth, and arranged to cooperate with not shown pawls, mounted on a structure of the timepiece, to ensure a unidirectional movement of the manoeuvring member, and its braking in position.

The invention relates to a time-limited power generation device 100 for a timepiece 1000.

This device 100 includes a manoeuvring member 1, which is manoeuvrable by a user against at least one elastic return means 2. This at least one elastic return means 2 is arranged to indirectly drive at least one electric generator 6, to generate an electric current for a limited time period.

In an advantageous manner, this electric generator 6 is an electromagnetic micro-generator.

According to the invention, the device 100 includes a toothed member 3, which is movable with a degree of freedom relative to the manoeuvring member 1, and which delimits with this manoeuvring member 1 a separate chamber 20 for receiving each elastic return means 2. This elastic return means 2 is held compressed in its chamber 20 between a pre-stressed position of rest and a position of maximum compression, between on the one hand a first support banking 11 which includes the manoeuvring member 1 and on the other hand a second support banking 32 which includes the toothed member 3. And the toothed member 3 is arranged to be driven by this at least one elastic return means 2 for driving the electric generator 6, directly or indirectly through a geartrain 4.

More particularly, in the absence of action by a user on the manoeuvring member 1, and in the absence of relaxation of this at least one elastic return means 2, the device 100 occupies a standby position in which the toothed member 3 is in abutment against the manoeuvring member 1, and each elastic return means 2 is in the pre-stressed position of rest in its respective chamber 20.

More particularly, the manoeuvring member 1 includes a first rest banking 12, and the toothed member 3 includes a second rest banking 33, which is arranged for cooperating by bearing on the first rest banking 12 in the position of rest of the at least one elastic return means 2.

More particularly, the first support banking 11 is supported by a first catch 10 which includes the manoeuvring member 1, and the second support banking 32 is supported by a second catch 30 which includes the toothed member 3.

More particularly, the first rest banking 12 is supported by the first catch 10 that includes the manoeuvring member 1, and the second rest banking 33 is supported by the second catch 30.

More particularly, the device 100 includes a non-return mechanism, which is arranged to prohibit, in the standby position, the driving of the manoeuvring member 1 by the at least one elastic return means 2.

More particularly, this non-return mechanism includes at least one notched ring 5 opposing, in the standby position, the drive of the manoeuvring member 1 by at least one elastic return means 2. In an advantageous manner, this notched ring 5 is similar to those used on diving watches, and is a wolf-toothed notched ring 55, and is mounted connected to the manoeuvring member 1, in particular a bezel, which can only have a unidirectional movement. This notching 55 cooperates with pawls 58 supported by a structure element 8 that includes the timepiece 1000, in particular a middle.

More particularly, the at least one elastic return means 2 is arranged, to push the toothed member 3 away from the manoeuvring member 1 when the user stops driving the manoeuvring member 1, and to return to its own position of rest.

More particularly, at least one elastic return means 2 is a helicoidal spring arranged to work in compression. Other embodiments are possible, for example a spiral spring.

More particularly, the manoeuvring member 1, the at least one elastic return means 2, and the toothed member 3, are movable in rotation about a common main axis DP.

More particularly, the manoeuvring member 1 is a bezel that is movable relative to a middle 8, 9.

In a not shown variant, the manoeuvring member 1 is a bolt, or a push-button, or the like.

Figure 7:
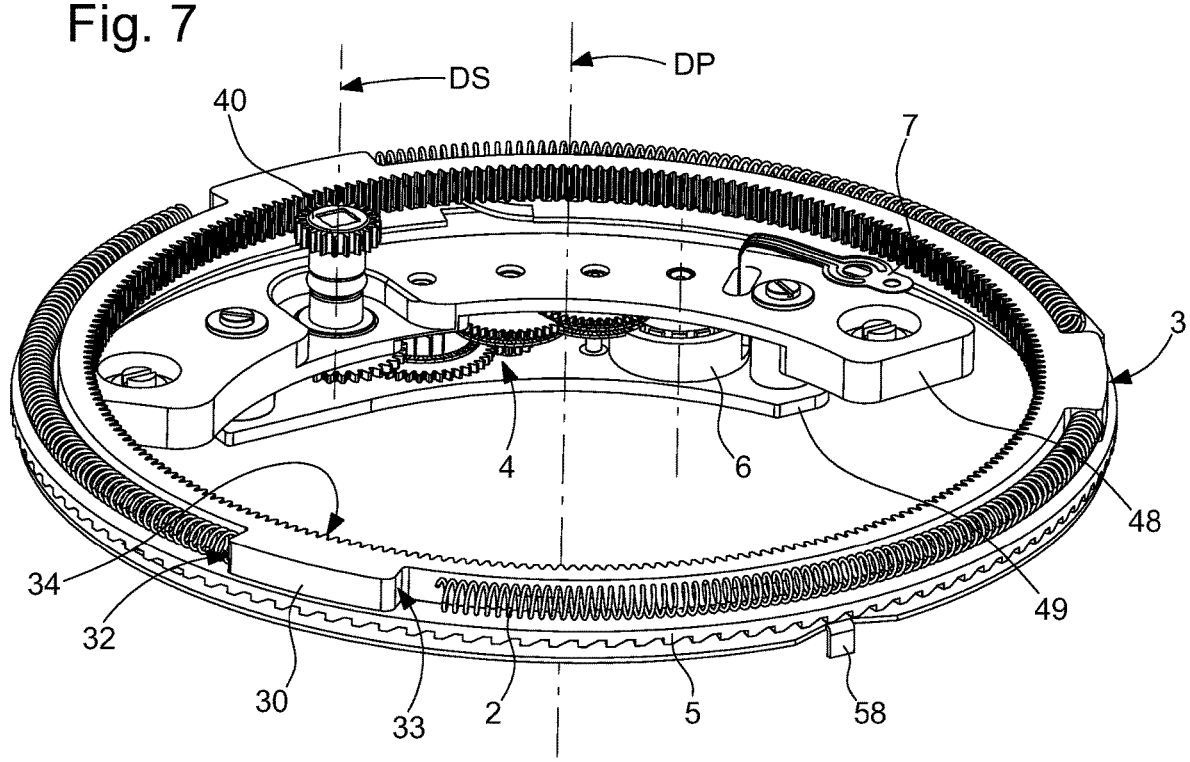
FIG. 7 shows, schematically and in perspective, a part of the time-limited power generation device according to the invention, with the toothed member meshing with the gear pinion, and the activation geartrain of the electric generator arranged between a sole and a bar, and a user circuit.
Figure 8:
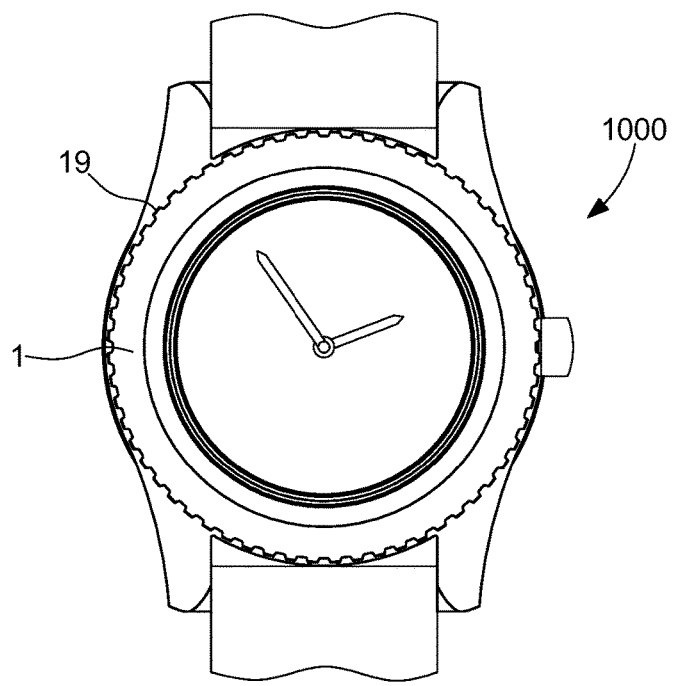
FIG. 8 shows, schematically and from the front, a watch including a manoeuvring member for controlling a time-limited power generation device according to the invention.

More particularly, the toothed member 3 includes a toothed surface 34 which is arranged to cooperate with a gear pinion 40, movable in rotation about a secondary axis DS, and that includes the geartrain 4, for driving the electric generator 6, when the toothed member 3 is driven by an elastic return means 2. FIG. 7 illustrates a non-limiting configuration where the gear pinion 40, the geartrain 4, the electric generator 6, are arranged between a sole 49 and a bar 48, where the discs are pivoted; the sole 49 can be the middle, or the plate, or the like.

It is understood that the electric generator 6 opposes a torque resistant to the rotation of the gear pinion 40, this resistant torque depends in particular on the user electrical circuits 7 of the electric current generated by the electric generator 6, and this resistant torque is not generally constant but progressive as the current is generated. A moment occurs when the driving torque exerted by the assembly of the elastic return means 2 is greater than this resistant torque, allowing the elastic return means 2 to relax and return to their position of rest; the duration of this relaxation corresponds to a limited and predetermined duration of the device's 100 own power supply, in the absence of further movement by the user. Of course, if the user continues to drive the manoeuvring member 1, the latter pushes the elastic return means 2 and consequently the toothed member 3, and drives the gear pinion 40; but as soon as the user ceases this driving movement, only the elastic return means 2 are driven during this predetermined limited period.

The gear pinion 40 can itself be driven either clockwise or anti-clockwise and power the electric generator 6 in the same manner. It is understood that the electric generator 6 operates in either drive direction, but in order for the energy storage system in the elastic return means 2 to operate, it is necessary to limit the drive of the manoeuvring member 1 to one direction only, so in practice the gear pinion 40 will only be driven in that direction, which can be selected independently at the time of manufacture of the watch. For this reason, the illustrated variant including a unidirectional bezel 1 with a non-return notched ring 5 and a pawl 58 is well suited to the implementation of the invention.

The invention further relates to a timepiece 1000 including at least one electric generator 6 for electrically powering at least one circuit 7. According to the invention, the timepiece 1000 includes at least one such time-limited power generation device 100, which is arranged to drive the at least one electric generator 6. The dimensions of the circuit(s) 7 and the nature of the power receiving components, such as LEDs, OLEDs, sound emitters, signal emitters or the like, directly determine the resistant torque opposing the drive of the gear pinion 40, and thus the threshold of the driving stroke of the elastic return means 2, and thus the predetermined limited duration of the supply of current.

In an advantageous manner, the invention makes it possible to dispense with any electronic energy management system as well as with any electrical energy storage means.

More particularly, the timepiece 1000 has no means of storing electrical energy.

More particularly, the timepiece 1000 is a watch.

The figures illustrate a particular, non-limiting embodiment, in which the timepiece 1000 is a watch, and the manoeuvring member 1 is a unidirectional rotating control bezel. This concept of watch bezel makes it possible to activate a magnetic micro-generator 6. By turning the bezel forming the manoeuvring member 1, the user activates a system of springs, each constituting an elastic return means 2. The energy stored in these springs is used for rotating, at a certain stage, a system of gears forming the geartrain 4 connected to the magnetic micro-generator 6. The electric power generated by the magnetic micro-generator 6 is used for supplying current to the receiver circuit 7, for example a light source. The duration of the lighting is then determined the time required for the springs 2 to return to their position of rest, corresponding to FIG. 2.

FIG. 1 shows the components of the control mechanism, in a particular non-limiting case with three springs 2 interposed between three inner catches 10 of the manoeuvring member 1 and three outer catches 30 of the toothed member 3.

Figure 2:
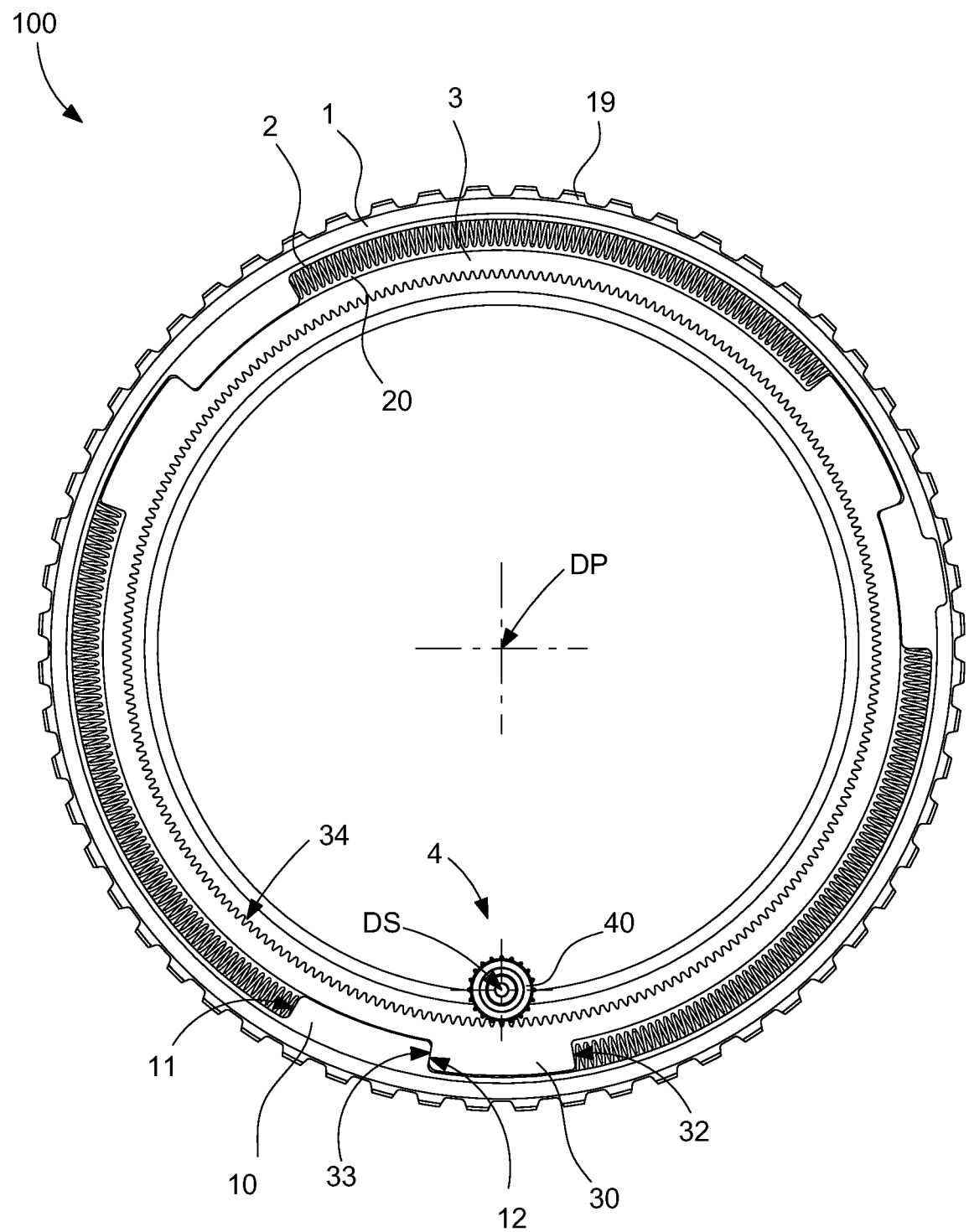
FIG. 2 shows, in a view from below, the control members of FIG. 1, with the toothed member meshing with a gear pinion that includes the geartrain of the electric generator. The springs are in a position of rest in which they are pre-stressed, each extends between an inner catch of the upper manoeuvring member, and an outer catch of the inner toothed member; each inner catch of the upper manoeuvring member bearing on an outer catch of the inner toothed member.

FIG. 2 shows the position of rest, in the absence of action by the user, the bezel 1 is held in position by pawls 58 cooperating with the wolf-toothed notched ring 55. The three inner catches 10 of the manoeuvring member 1 are in abutment with the three outer catches 30 of the toothed member 3, respectively by first rest bankings 12 in contact with second rest bankings 33. In this position of rest, each spring 2 is already pre-stressed, i.e. partially compressed. The inner toothed surface 34 of the toothed member 3 meshes with the gear pinion 40 belonging to the drive geartrain 4 of the magnetic micro-generator 6.

Figure 3:
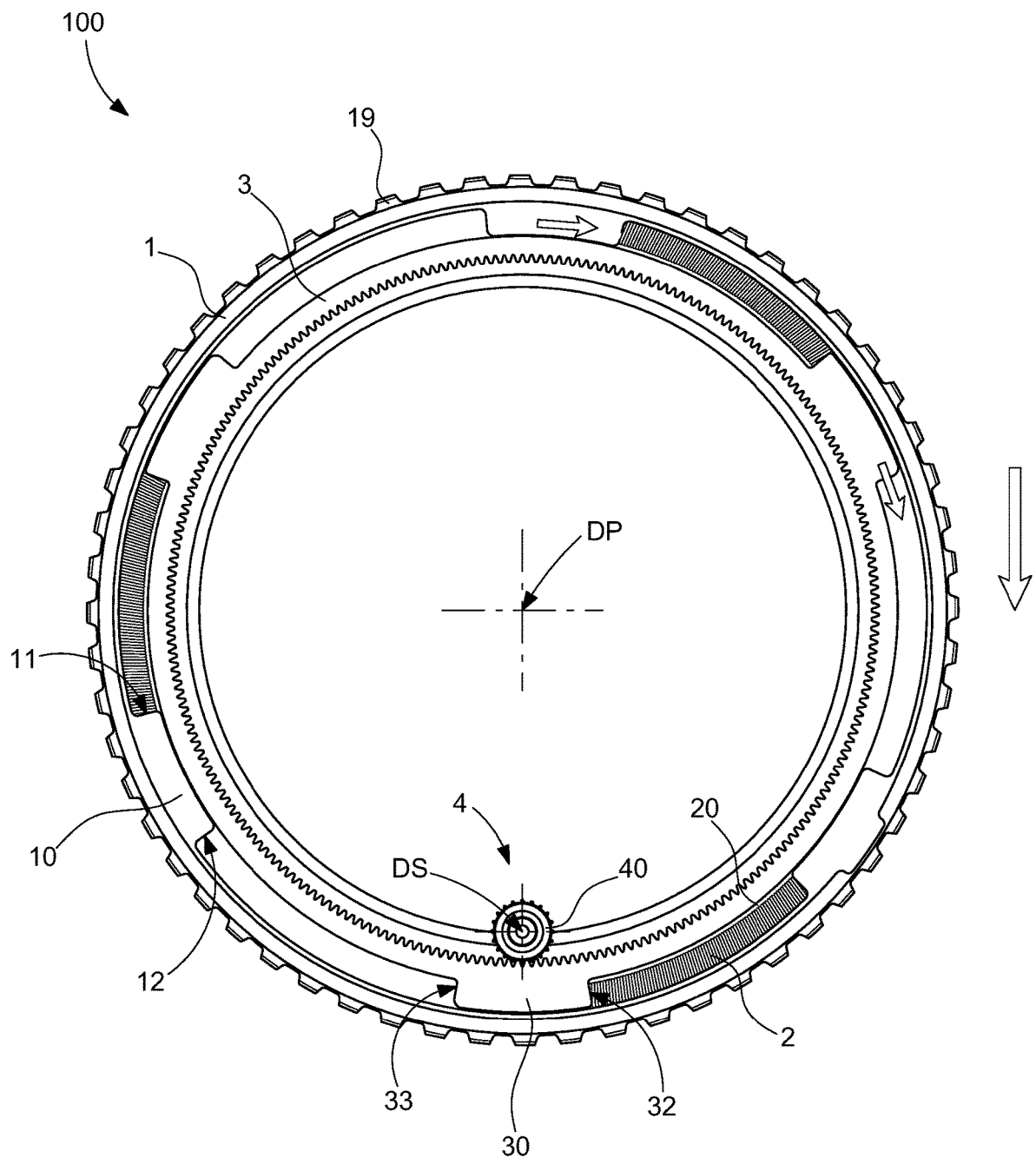
FIG. 3 shows, in a similar manner to FIG. 2, the same assembly, after a first angular stroke applied to the manoeuvring member, while the toothed member and the gear pinion are held stationary by the resisting torque of the feed geartrain of the electric generator.

FIG. 3 shows the position of the assembly after a first rotation of the bezel 1: the inner catches 10 have started to compress the springs 2; the notched ring 5 prevents the bezel 1 from moving backwards from the reaction of the springs 2.

Figure 4:
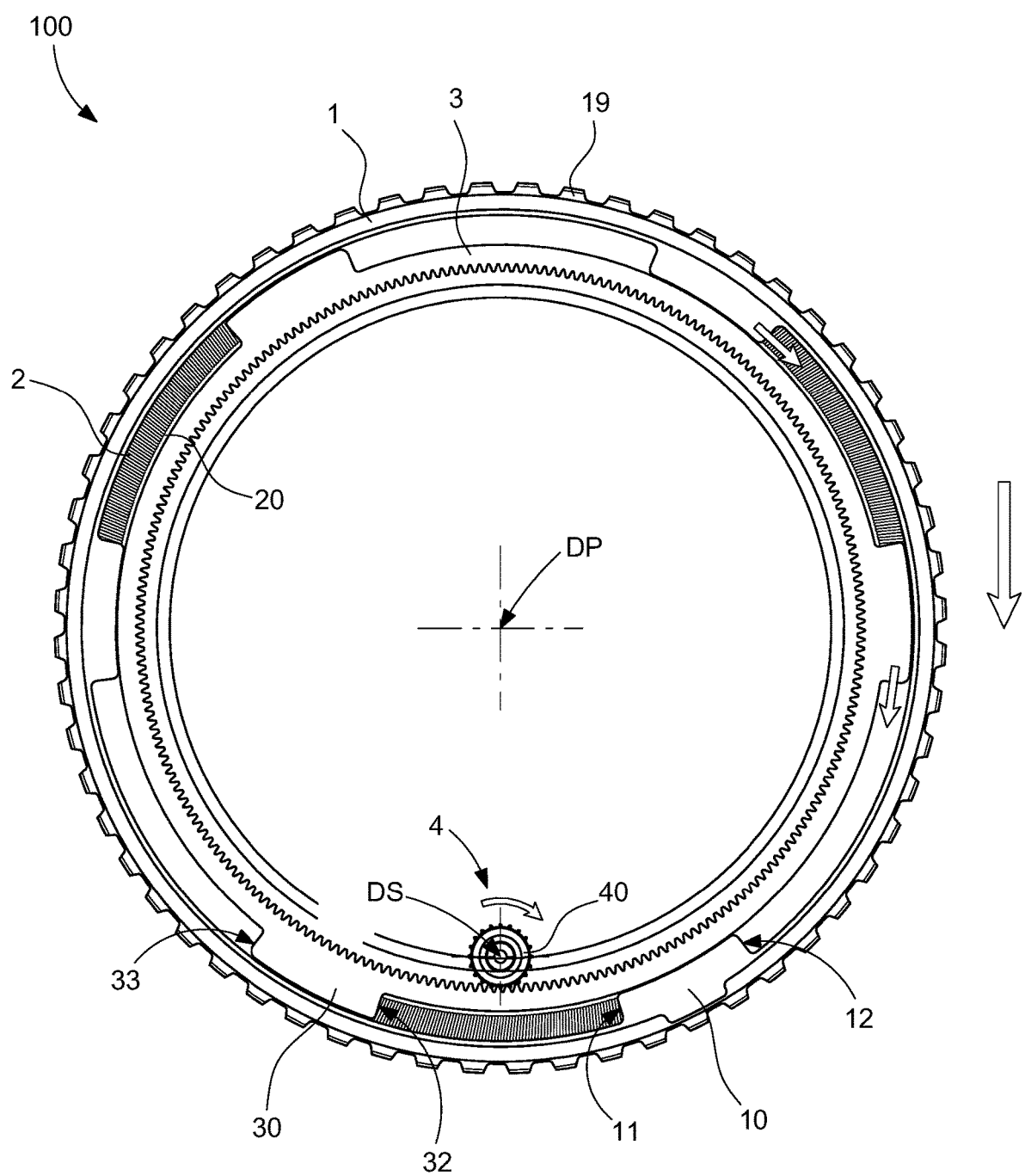
FIG. 4 shows, in a similar manner to FIGS. 2 and 3, the same assembly, after a second angular stroke applied to the manoeuvring member, having the effect of further compressing the springs and overcoming the resisting torque of the feed geartrain of the electric generator; the toothed member and the gear pinion are driven in rotation, allowing the activation of the electric generator through the geartrain.
Figure 5:
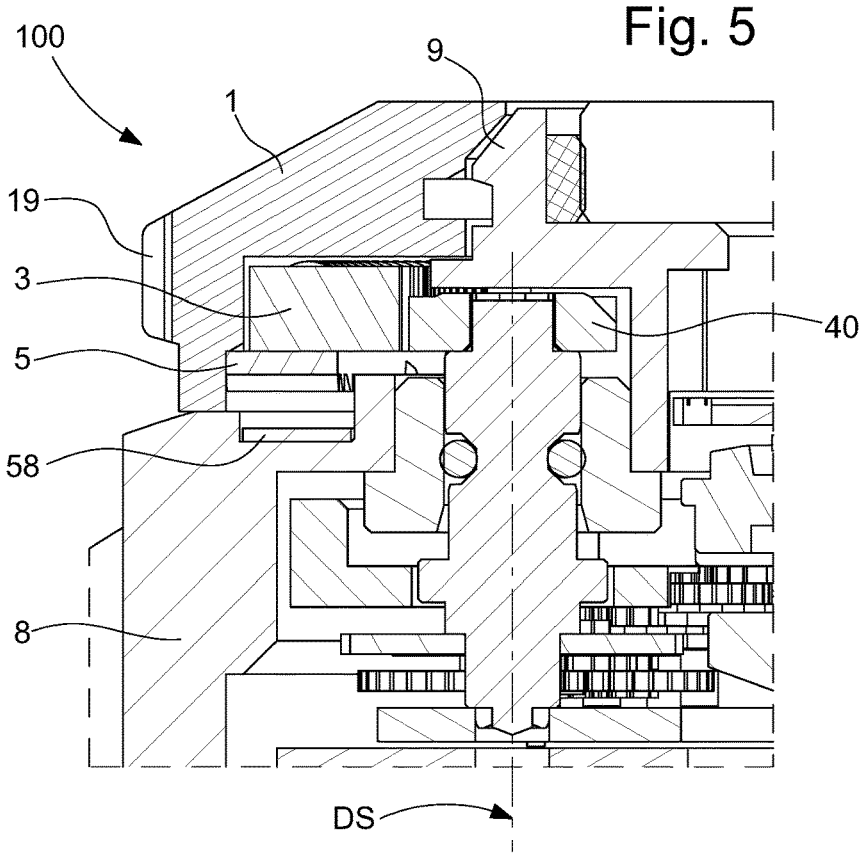
FIG. 5 shows, schematically and in cross-section through the main axis and through the secondary axis of the gear pinion, in the six o'clock position of FIG. 4, the time-limited power generation device according to the invention.
Figure 6:
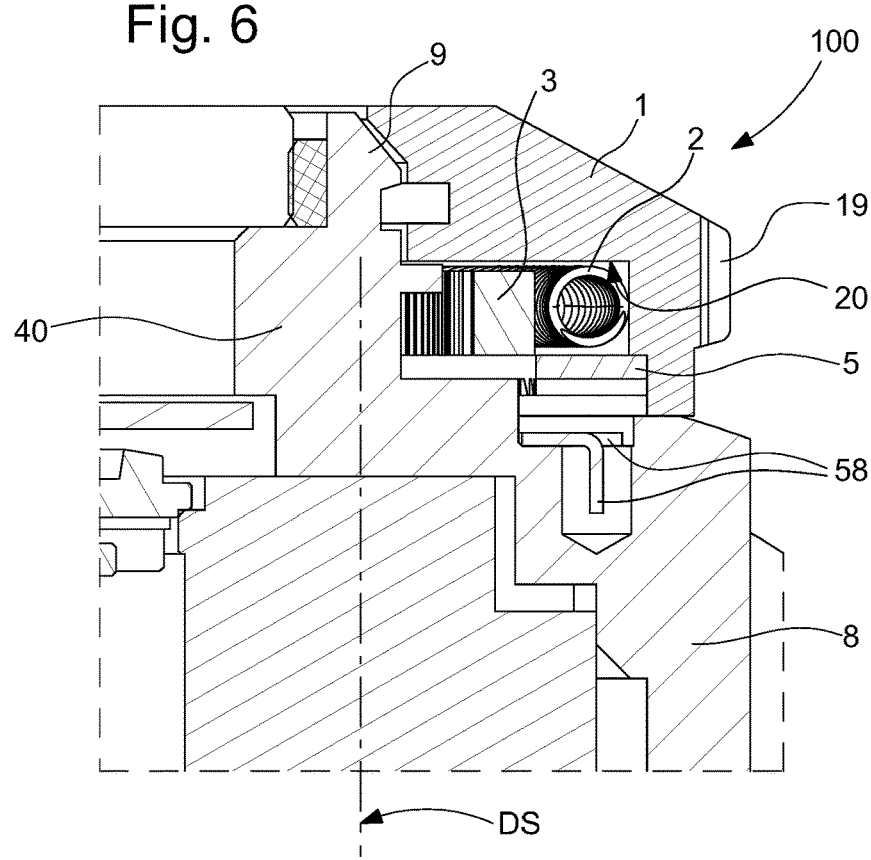
FIG. 6 shows, schematically and in cross-section through the main axis, in the one o'clock position of FIG. 4, the time-limited power generation device according to the invention.

The toothed member 3 remains initially in its position of rest, until the pressure of the springs 2 allows it to overcome the static torque of the gear system and the micro-generator, as shown in FIG. 4, where the mechanism is released. From this moment, the toothed member 3 drives the system, allowing the magnetic micro-generator 6 to rotate, at a speed which depends on the multiplicative factor of the geartrain 4.

During rotation, the torque of the magnetic micro-generator 6 depends on the generated current. In the case of a direct connection between the magnetic micro-generator 6 and a user circuit 7 including for example an LED, a curve of the brightness as a function of the duration of the rotation can be established.

According to the application, the power absorbed by a lighting system for a watch can vary between 3 mW and 15 mW. For a timepiece application, it is desirable that the duration of the lighting is at least 3 seconds.

For a system as illustrated by the figures, values can be achieved for the stiffness of the springs 2 of between 0.025 and 0.050 N/mm, more particularly between 0.035 and 0.040 N/mm, with a multiplicative coefficient of the geartrain 4 of between 1400 and 1900, more particularly between 1600 and 1700, a static torque of the micro-generator 6 of between 8 and 14 µN·m, more particularly between 10 and 12 µN·m, and a starting torque of the crown of between 0.020 and 0.036 N·m, more particularly between 0.025 and 0.030 N·m.

In summary, the invention makes it possible to provide a compact and economical solution to the problem of generating electric current for an additional function of a timepiece, in particular a watch, without requiring energy storage or electronics for stabilisation. The transformation of existing components on rotating bezel watches is limited to the machining of grooves forming chambers 20 and inner catches 10 in the bezel 1, the reuse of the wolf-toothed notched ring 55 and associated pawls 58, without modification of the middle at this level, the addition of a toothed member 3 of simple geometry, and springs 2 from the trade, as well as a gear pinion 40, the only modifications of the middle relating to the housing of the toothed member 3, and the implantation of this pinion 40 and elements of the geartrain 4 known elsewhere. The toothed member 3 can be inserted into the thickness of the bezel 1, the total thickness of the watch is only slightly affected by being equipped with such a device 100, in case the device 100 is designed as an additional mechanism for an existing watch. Of course, it is possible to configure a size which directly integrates the elements of the geartrain 4 as well as the micro-generator 6 and the circuit user 7 (flex, LED, or the like, in particular electronics), without increasing the dimensions of the middle.

The invention claimed is:

1. A time-limited power generation device for a timepiece, including a manoeuvring member manoeuvrable by a user against at least one elastic return means arranged to drive indirectly at least one electric generator for generating an electric current for a limited period, wherein said device includes a toothed member movable with a degree of freedom relative to said manoeuvring member and delimiting with said manoeuvring member a separate chamber for receiving each said elastic return means, which said elastic return means is held compressed in its said chamber between a pre-stressed position of rest and a position of maximum compression, between a first support banking that includes said manoeuvring member and a second support banking that includes said toothed member, wherein said toothed member is arranged to be driven by said at least one elastic return means for driving said electric generator directly or indirectly through a geartrain, wherein said manoeuvring member, said at least one elastic return means, and said toothed member, are movable in rotation about a common main axis, and wherein said manoeuvring member is a movable bezel mobile relative to a middle.

2. The time-limited power generation device according to claim 1, wherein in the absence of action by a user on said manoeuvring member, and in the absence of relaxation of said at least one elastic return means, said device occupies a standby position in which said toothed member is in a position of abutment against said manoeuvring member, and each said elastic return means is in said pre-stressed position of rest in its respective chamber.

3. The time-limited power generation device according to claim 1, wherein said manoeuvring member includes a first rest banking, and wherein said toothed member includes a second rest banking which is arranged to cooperate in abutment with said first rest banking in said position of rest of said at least one elastic return means.

4. The time-limited power generation device according to claim 1, wherein said first support banking is supported by a first catch that includes said manoeuvring member and wherein said second support banking is supported by a second catch that includes said toothed member.

5. The time-limited power generation device according to claim 3, wherein said first rest banking is supported by said first catch that includes said manoeuvring member and wherein said second rest banking is supported by said second catch.

6. The time-limited power generation device according to claim 1, wherein said device includes a non-return mechanism arranged to prevent, in said standby position, the driving of said manoeuvring member by said at least one elastic return means.

7. The time-limited power generation device according to claim 6, wherein said non-return mechanism includes at least one toothed ring opposing in said standby position, the driving of said manoeuvring member by said at least one elastic return means.

8. The time-limited power generation device according to claim 1, wherein said at least one elastic return means is arranged, when said manoeuvring member is stopped by the user to push said toothed member away from said manoeuvring member, and return to its own said position of rest.

9. The time-limited power generation device according to claim 1, wherein said at least one elastic return means is a helicoidal spring arranged to work in compression.

10. The time-limited power generation device according to claim 1, wherein said toothed member includes a toothed surface arranged to cooperate with a gear pinion, rotatable about a secondary axis, and that includes said geartrain, for driving said electric generator, when said toothed member is driven by said at least one elastic return means.

11. The timepiece including the at least one electric generator for the power supply of at least one circuit, wherein said timepiece includes at least one of the time-limited power generation device according to claim 1 arranged for driving said at least one electric generator.

12. The timepiece according to claim 11, wherein said timepiece has no means for storing electrical energy.

13. The timepiece according to claim 11, wherein said timepiece is a watch.

14. The time-limited power generation device according to claim 1, wherein the movable bezel comprises a circular perimeter, and wherein the first support banking and the second support banking are at a same radial distance from the circular perimeter of the movable bezel.

15. The time-limited power generation device according to claim 1, wherein the elastic return means comprises a spring that is longitudinally extended along an inside of the circular perimeter of the movable bezel.

16. The time-limited power generation device according to claim 1, wherein said manoeuvring member, said at least one elastic return means, and said toothed member, are movable in rotation, about the common main axis, along an inside of the circular perimeter of the movable bezel.

* * * * *